H. H. STEPHENS.
CENTRIFUGAL HANGER.
APPLICATION FILED JAN. 10, 1919.

1,365,290.

Patented Jan. 11, 1921.

INVENTOR
Harry H. Stephens
by Cornelius D. Ehret
his ATTORNEY

UNITED STATES PATENT OFFICE.

HARRY H. STEPHENS, OF PATERSON, NEW JERSEY.

CENTRIFUGAL HANGER.

1,365,290. Specification of Letters Patent. Patented Jan. 11, 1921.

Application filed January 10, 1919. Serial No. 270,512.

*To all whom it may concern:*

Be it known that I, HARRY H. STEPHENS, a citizen of the United States, residing in Paterson, State of New Jersey, have invented a new and useful Centrifugal Hanger, of which the following is a specification.

My invention relates to means for suspending centrifugal machines or to other apparatus employing a gyrating shaft or spindle.

In accordance with my invention I provide a buffer of rubber or other suitable material which resiliently opposes oscillation or gyration of the centrifugal basket or the shaft, and which preferably also carries the weight of the shaft and parts attached thereto, the parts engaging the lateral faces of the buffer being so formed that while permitting gyration, greater resistance to gyration is offered.

By my invention either or both of the parts engaging the lateral faces of the buffer is or are grooved, corrugated, recessed or otherwise formed so that the buffer, particularly when carrying the weight of the gyratory shaft and parts attached thereto, is compressed to partly or completely fill such grooves or recesses and thereby increase the skin effect between the rubber buffer and the parts engaging the same, and so increase the skin friction and thereby offer greater resistance to gyration of the shaft without, however, preventing or unduly reducing gyration.

For an illustration of one of the various forms my invention may take, reference may be had to the accompanying drawing, in which.

Figure 1:
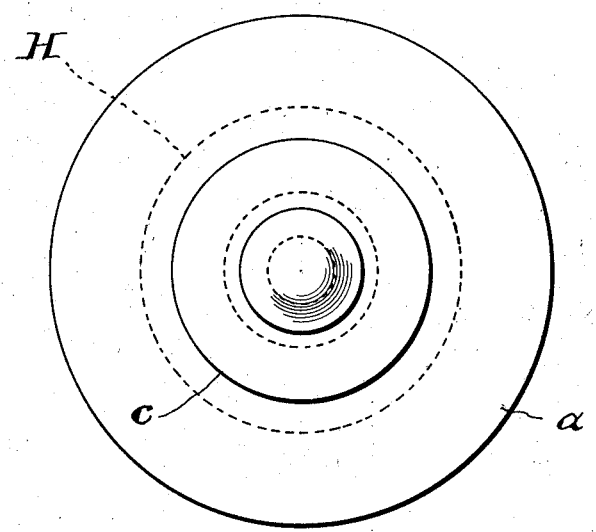
Figure 1 is a top plan view of structure embodying my invention.
Figure 2:
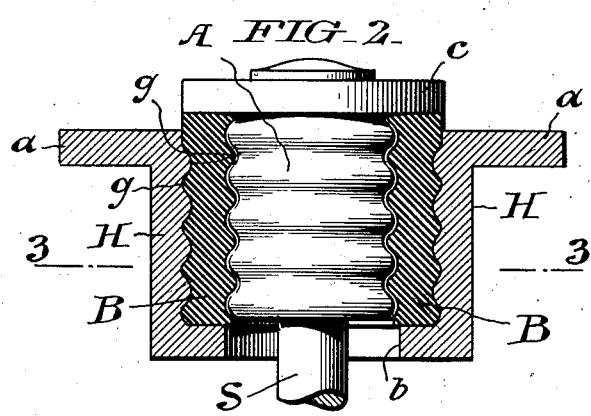
Fig. 2 is a vertical sectional view, some parts in elevation, of the structure shown in plan in Fig. 1.
Figure 3:
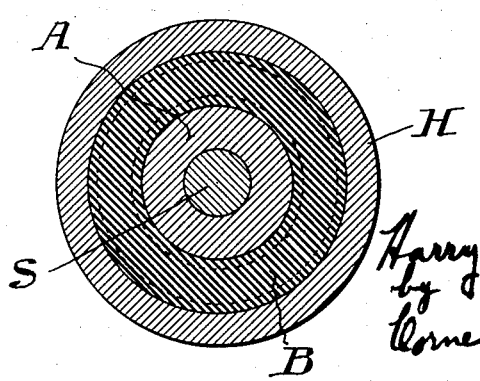
Fig. 3 is a horizontal sectional view on the line 3—3 of Fig. 2.

Referring to the drawing, H is the hanger having the flange $a$ by which it is rigidly secured to any suitable support, as beams of a building, etc. At its bottom it has the inwardly turned flange $b$ upon whose top side rests the lower end of the buffer B, of rubber or other suitable material. The buffer B may be, before placed in position, a hollow cylinder or the like, that is, a body having substantially smooth internal and external surfaces, and is preferably circumferentially integral, though the same may be divided into a suitable number of sections which, when placed in position, may in effect produce a more or less circumferentially complete structure. Resting upon the top edge of the buffer B is the flange $c$ on the housing A which supports the downwardly extending vertical spindle or shaft S, which may have within the pot or housing A bearings allowing its rotation, in well known manner. It will be understood, however, that my invention is also applicable to the case where the shaft S does not rotate with respect to the member A, but is secured thereto, in which case a hollow spindle or shaft to which the centrifugal basket is secured, as well understood in the art, may be supported by and rotate upon the spindle or shaft S.

The outer surface of the member A is shown as grooved or corrugated at $g$, preferably horizontally or substantially horizontally, whereby the buffer B, when carrying the weight of the spindle S and everything supported thereby, is compressed and forced partly or completely into such grooves, depressions, recesses or corrugations.

Similarly the inner wall of the hanger H is grooved, recessed or corrugated at $g$, in any suitable manner, and into such depressions, grooves, corrugations or recesses the buffer B is partly or fully compressed.

Accordingly, when the shaft or spindle S gyrates, the buffer B will yield and permit gyration; but by grooving, recessing or otherwise suitably shaping the exterior of the member A and the interior of the member H, or either of them alone, materially additional resistance is offered to the gyratory movement of the shaft S when, as in centrifugal machines, unloading or unbalancing causes the gyration.

By my construction, not only is gyration more effectively controlled or more effectively restricted, but the wear upon the buffer B is materially decreased, because the increased skin friction of the buffer and the parts engaging the same prevents largely any relative movement of the buffer upon the parts, with consequent reduction of wear.

While the buffer has been above described as being normally of simple cylindrical or equivalent shape before compression, it will be understood also that my invention contemplates the use of a buffer which is suitably corrugated, recessed, grooved or otherwise formed to accord more or less completely with the formation of the exterior and interior surfaces, respectively, of the parts A and H.

While the grooves or corrugations on the members A and H are shown as horizontal, which is my preferred construction, it will be understood that they may be disposed other than horizontally, as for example, more or less inclined; or in such manner that they shall have a substantial horizontal component, when the shaft S is employed in a vertical position; and in general the grooves, corrugations, recesses or depressions are so disposed as to produce the desired effect herein described.

It will be noted that the greatest depth of the grooves or corrugations in the member H is displaced vertically as regards the greatest depth of the grooves or corrugations in the member A, though my invention is not limited to such relative position of the grooves, corrugations or depressions.

What I claim is:

1. In apparatus of the character described, the combination with a hanger, of a shaft supporting member, a buffer between said hanger and said member opposing gyration of said member, the buffer engaging face of said hanger having corrugations extending in a direction having a substantial horizontal component to receive said buffer.

2. In apparatus of the character described, the combination with a shaft supporting member, of a hanger spaced from and concentric with the face of said supporting member, and a buffer member engaged between said supporting member and said hanger, the face of said supporting member engaging said buffer member being grooved intermediate the ends of said buffer member in a direction having a substantial horizontal component.

3. In apparatus of the character described, the combination with a hanger, of a shaft supporting member, a buffer between said hanger and said member opposing gyration of said member, the buffer engaging face of said member having corrugations extending in a direction having a substantial horizontal component to receive said buffer.

4. In apparatus of the character described, the combination with a hanger, of a shaft supporting member, and a longitudinally continuous buffer member between said hanger and said supporting member, buffer member engaging faces of said supporting member and said hanger being recessed intermediate the ends of said buffer member.

5. In apparatus of the character described, the combination with a hanger, of a shaft supporting member, a buffer between said hanger and said member opposing gyration of said member, the buffer engaging faces of said hanger and member having corrugations extending in a direction having a substantial horizontal component to receive said buffer.

6. In apparatus of the character described, the combination with a hanger, of a shaft supporting member, and a resilient buffer member between said hanger and said supporting member having when uncompressed substantially smooth inner and outer faces, the face of said supporting member engaging said buffer member being recessed or grooved, whereby said supporting member is held against longitudinal movement with respect to said buffer member when compressed against said buffer member.

7. In apparatus of the character described, the combination with a hanger and a shaft supporting member, of a buffer member compressed between said hanger and said supporting member and opposing gyration of said supporting member, said buffer member when uncompressed having substantially smooth faces and the face of said hanger engaging said buffer member being grooved or recessed, whereby said shaft supporting member and the parts attached thereto are supported on said hanger through said buffer member.

8. In apparatus of the character described, the combination with a tubular hanger having a recessed or grooved inner face, of a tubular resilient continuous buffer member within and engaging said hanger, and a substantially cylindrical shaft supporting member having a recessed or grooved face engaging said buffer member, said buffer member being compressed between the recessed or grooved faces of said hanger and said supporting member, whereby the faces of said buffer member are distorted into said recesses or grooves and said hanger and shaft supporting member are held against substantial movement with respect to each other.

9. In apparatus of the character described, the combination with a hanger, of a shaft supporting member, a buffer disposed between said hanger and member to oppose gyration of said member, the buffer engaging faces of said member and hanger being substantially horizontally grooved or corrugated to receive said buffer, the grooves or corrugations in said hanger being displaced vertically with respect to the grooves or corrugations in said member.

In testimony whereof I have hereunto affixed my signature the 8" day of January, 1919.

HARRY H. STEPHENS.